United States Patent [19]

Uchiyama et al.

[11] Patent Number: 5,401,572

[45] Date of Patent: Mar. 28, 1995

[54] MAGNETIC RECORDING MEDIUM AND MAGNETIC RECORDING METHOD FOR DIGITAL IMAGE SIGNAL

[75] Inventors: Hiroshi Uchiyama; Naoki Honda; Takanori Sato, all of Miyagi, Japan

[73] Assignee: Sony Corporation, Tokyo, Japan

[21] Appl. No.: 902,590

[22] Filed: Jun. 22, 1992

[30] Foreign Application Priority Data

Jun. 27, 1991 [JP] Japan .................................. 3-157085
Jun. 29, 1991 [JP] Japan .................................. 3-185120

[51] Int. Cl.⁶ ........................ B32B 5/16; B32B 27/00; G11B 5/66
[52] U.S. Cl. .................... 428/336; 428/473.5; 428/694 T; 428/684 TC; 428/684 ST; 428/684 SL
[58] Field of Search ............... 428/684, 900, 695, 480, 428/474.4, 473.5, 694 T, 684 TC, 684 ST, 684 SL, 336

[56] References Cited

U.S. PATENT DOCUMENTS 4,557,982 12/1985 Nouda et al. .................. 428/694
4,886,874 12/1989 Nagano ........................... 528/353

*Primary Examiner*—Paul J. Thibodeau
*Assistant Examiner*—L. Killman
*Attorney, Agent, or Firm*—William S. Frommer; Alvin Sinderbrand

[57] ABSTRACT

The coefficient $k_1$ of linear expansion in a temperature range from 50° to 300° C. of a non-magnetic support member of a recording medium, before a Co-Cr alloy film is formed thereon, is less than 0 mm/mm °C., and the coefficient $k_2$ of linear expansion in a temperature range from 50° to 300° C. of that support member after the Co-Cr alloy film is formed is less than $0.3 \times 10^{-5}$ mm/mm °C. The alloy film also includes carbon in the magnetic layer, and a protective film comprised of carbon is further formed on the magnetic layer. The recording medium is particularly adapted for perpendicular magnetic recording.

3 Claims, 8 Drawing Sheets

MAGNETIC RECORDING MEDIUM AND MAGNETIC RECORDING METHOD FOR DIGITAL IMAGE SIGNAL

BACKGROUND OF THE INVENTION

Field of the Invention

This invention relates to a magnetic recording medium and a method for magnetically recording a digital image signal in a digital VTR, etc., and more particularly to a perpendicular magnetic recording medium having excellent slide durability, and a magnetic recording method adapted to compress a digital image signal in a form which reduces distortion in reproduction to record the compressed data onto the perpendicular magnetic recording medium.

Description of the Related Art

In the field of magnetic recording, high density has been a desired objective, and digital signals have replaced analog signals. For this reason, design of a medium having high density and particularly suited for digital signals is required.

Until now, the so-called in-plane magnetic recording system using a magnetic recording medium having an axis of easy magnetization along the plane thereof was widely used. With this system, however, as the recording density is increased, the directions of magnetization of the magnetic recording medium tend to repel each other. For this reason, there is a limitation in realizing high density. Therefore, it is difficult to obtain the high density that is required.

Furthermore, as the intervals between magnetization reversals in the in-plane magnetic recording system become narrow (i.e. as the density becomes higher) if magnetization reversal is repeated twice, peak shifts due to the phenomenon of magnetization repulsion and waveform interference are apt to take place more frequently resulting in a deterioration in the error rate.

To overcome these drawbacks, a perpendicular magnetic recording system has been proposed using a magnetic recording medium having an axis of easy magnetization in a direction perpendicular to the film surface.

In the perpendicular magnetic recording system, the demagnetization effect is extremely small as compared to the in-plane magnetic recording system, thus making it possible to drastically increase the recording density. Further, magnetization repulsion does not take place where magnetization reversal is repeated twice, but peak shifts due to waveform interference may be produced. Hence, correction may be made rather easily.

The magnetic layer of a magnetic recording medium used in the magnetic record medium of this perpendicular magnetic recording system is an alloy film of Co-Cr formed by sputtering, vacuum deposition, etc. When forming a Co-Cr alloy film by sputtering vacuum deposition, to ensure a predetermined coercive force Hc (e.g., more than 700 ersteds = 56 KA/m) the substrate temperature at the time of forming the film should be more than about 180° C.

However, when forming a film with a thickness less than 10 μm, when the substrate is heated, the following disadvantages take place.

First, since the temperature of the roll used to heat the film substrate is high, and the temperature difference ($\Delta T$) between the temperature of the roll and the initial temperature of the film substrate (room temperature) is large, even if the coefficient (k) of thermal expansion of the film substrate is small, thermal expansion ($\Delta L = k \times \Delta T$) becomes large, so ravelling or shriveling takes place because thermal radiation by sputtering or vacuum deposition also occurs at this time.

Further, when the temperature of the film substrate subsequently is lowered to room temperature the amount of contraction of the film substrate exceeds that of the metal magnetic thin film, resulting in a tendency for cupping (curvature in the tape width direction) with the metal magnetic thin film in the region outside of the film substrate being large.

Where cupping becomes large, contact of the magnetic head with the magnetic recording medium becomes worse, and the magnetic head no longer is in uniform contact with the magnetic recording medium. Thus, a change of the signal envelope and/or an increase in the error rate take place.

To prevent such disadvantages, a method has been proposed in which the film substrate is mechanically pulled or drawn by means of an expander roll immediately before it is introduced to the thermal roll, thus allowing the thermal expansion and contraction to cancel each other.

However, the material used for the expander roll generally is a synthetic rubber, but there are not many types of synthetic rubber having good heat resistance up to about 200° C. In addition, even if the synthetic rubber exhibits an acceptable heat resisting property, there is the possibility that an impurity gas may be produced when such rubber is exposed to high temperatures. Accordingly, there is the added problem that durability becomes worse. It is therefore desirable not to use such synthetic rubber expander rolls.

On the other hand, because the perpendicular magnetic recording medium having a Co-Cr alloy film as a magnetic layer is a thin film type of record medium, the slide durability of the record medium is a significant problem. In digital VTRs since the relative speed of the magnetic head and the magnetic tape is far higher than in analog VTRs, e.g. twice or more that of an 8 mm VTR, it is very important to select a protective film having excellent slide durability.

OBJECT AND SUMMARY OF THE INVENTION

An object of this invention is to provide a Co-Cr perpendicular magnetic recording medium in which the value of the coefficient of linear expansion of the nonmagnetic support member is in a specific range, thus eliminating signal deterioration due to ravelling or shriveling, and reducing the error rate due to cupping.

Another object of this invention is to provide a perpendicular magnetic recording medium having excellent slide durability by selecting a protective film suitable for a Co-Cr alloy film, thus ensuring good slide durability when recording a digital image signal.

To achieve the above objects there is provided a magnetic recording medium in which a metal magnetic thin film including Co and Cr as its major component is formed on a nonmagnetic support member, wherein the coefficient $k_1$ of linear expansion of the support member in a temperature range from 50° to 300° C. before the metal magnetic thin film is deposited is less than 0 mm/mm °C., and the coefficient $k_2$ of linear expansion in the same temperature range 50° to 300° C. after the metal magnetic thin film is deposited is less than $0.3 \times 10^{-5}$ mm/mm °C. Further, there is provided a magnetic recording method for a digital image signal, which is adapted to convert an input digital image into blocks of signal data with each block comprised of a plurality of pixel data thereby to compression-code the data and implement channel coding of the compression-coded data, and to record the channel coded data onto a magnetic recording medium by using a magnetic head affixed to a rotary drum. The magnetic recording medium is formed of a metal magnetic thin film including Co and Cr as a major component deposited on a non-magnetic support member, characterized in that the coefficient $k_1$ of linear expansion of the support member in a temperature range from 50° to 300° C. before the metal magnetic film is deposited is less than 0 mm/mm °C., and the coefficient $k_2$ of the support member of linear expansion in a temperature range from 50° to 300° C. after the metal magnetic film is deposited is less than $0.3 \times 10^{-5}$ mm/mm °C. The metal magnetic thin film also contains 0.05 to 2.0% by weight of carbon to form the magnetic layer on the non-magnetic support member, and a carbon protective film having a thickness of 30 to 400 Å is formed on the metal magnetic thin film.

Namely, this invention employs a Co-Cr perpendicular magnetic recording medium in which the value of the coefficient of linear expansion of the non-magnetic support member is in a specific range, thus eliminating deterioration of the head-to-medium of the characteristic due to ravelling or shriveling, and minimizing cupping so as to reduce the error rate.

The coefficient of linear expansion of primary concern is along the width or transverse direction (hereinafter referred to as the TD direction) perpendicular to the transport direction (hereinafter referred to as the MD direction) of the film when formed. As a result of experimental studies, it has been found that the coefficient $k_1$ of linear expansion of the non-magnetic support member before the metal magnetic film is formed, or deposited should be less than 0 mm/mm °C. in the temperature range 50° to 300° C. Further, it has been found that the coefficient $k_2$ of linear expansion of the non-magnetic support member after the metal magnetic thin film is formed should be less than $0.3 \times 10^{-5}$ mm/mm °C. in the temperature range 50° to 300° C.

If the coefficient of linear expansion $k_1$ or $k_2$ exceeds the above values, the non-magnetic support member attempts to expand in the TD direction when in contact with a high temperature roll, so ravelling or shriveling may take place.

The reason for prescribing the coefficients of linear expansion $k_1$ and $k_2$ of the non-magnetic support member to particular ranges is as follows. The non-magnetic support member must be heated when the magnetic film is deposited so as to ensure a predetermined magnetic characteristic (particularly, coercive force Hc) in the perpendicular magnetic recording medium using a Co-Cr alloy film as the magnetic layer. This is quite different from the process of using, as the magnetic layer, a Co-Ni alloy film or a Co-O film, in which the roll is cooled to about −20° C. to carry out vacuum deposition. In this latter process, the value of the coefficient of linear expansion does not matter.

To limit the coefficients of linear expansion $k_1$ and $k_2$ to the above-mentioned ranges, a drying process may be used while pulling or drawing a base film in the TD direction by means of an expander roll, thus forming a base film in which tensile strength remains. Now, when this base film is heated, contraction due to the relaxation of the tensile stress takes place in addition to thermal expansion of the material itself. As a result, when the quantity of relaxation exceeds the thermal expansion, the coefficient $k_1$ of the linear expansion seemingly becomes equal to or less than zero.

Accordingly, by adjusting the drying temperature or the tensile stress in the drying process, the coefficient of linear expansion $k_1$ and/or the coefficient of linear expansion $k_2$ my be controlled.

The improved results obtained by thus controlling the coefficient of linear expansion $k_1$ or the coefficient of linear expansion $k_2$ as previously described, are particularly noted when the film thickness of the non-magnetic support member is less than 10 μm. If the film thickness is above 10 μm, e.g., if the thickness is above 20 μm, the coefficient of linear expansion $k_1$ is small, and even if $k_1$ is equal to or larger than zero, ravelling or shriveling is not likely to occur.

It is to be noted that the Co-Cr alloy film which is used as the magnetic layer may be any composition conventionally used in a perpendicular magnetic recording medium and the film may be formed by sputtering or vacuum deposition.

When the coefficient of linear expansion $k_1$ before the metal magnetic thin film is formed on the non-magnetic support member is less than 0 mm/mm °C. in the temperature range 50° to 300°, or when the coefficient of linear expansion $k_2$ after the metal magnetic thin film is formed is less than $0.3 \times 10^{-5}$ mm/mm °C. in the temperature range 50° to 300° C., the occurrence of ravelling or shriveling is suppressed. This is explained by considering the coefficient of linear expansion $k_1$ before thermal hysteresis.

If the coefficient of thermal expansion $k_1$ of a thin film base to which tension is applied in the MD direction while it is introduced to a high temperature roll is greater than zero, the base attempts to expand in the TD direction. But, the base cannot freely expand in the TD direction because of the tension applied thereto, so ravelling or shriveling occurs by the strain of expansion. When the coefficient of linear expansion $k_1$ is large, the amount of expansion likewise becomes large, resulting in an increased number of shriveled portions. However, if the coefficient of linear expansion $k_1$ is less than zero, the base film attempts to contract in the TD direction when it is in contact with the high temperature roll, thus preventing shriveling from taking place.

As a result of this improved record medium, when a digital image signal is recorded thereon by a perpendicular magnetic recording technique, the head-to-medium characteristic of every head is excellent, thereby improving the error rate.

DESCRIPTION OF THE PREFERRED EMBODIMENTS

Preferred embodiments of this invention will now be described with reference to the attached drawings.

Figure 1:
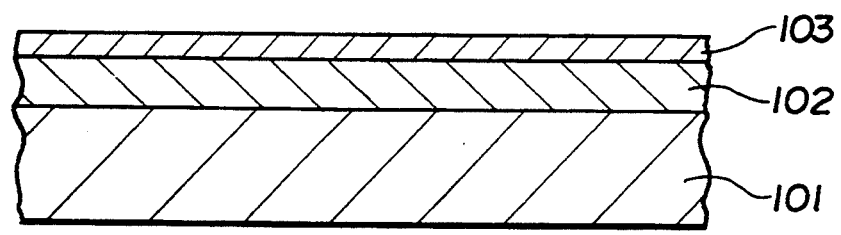
FIG. 1 is a schematic view showing a perpendicular magnetic recording medium according to an embodiment of this invention.

Referring to FIG. 1, there is shown a perpendicular magnetic recording medium in accordance with this invention. As shown in this figure, a Co-Cr alloy film 102 containing C is formed as a magnetic layer on a non-magnetic support member 101, and a protective film 103 comprised of carbon is formed on film 102.

Here, the Co-Cr alloy film 102 containing C includes Co and Cr as its major components, and its composition may be such that the Co-Cr alloy functions satisfactorily as the magnetic body. Ordinarily, Cr is 0 to 25% by weight.

Further, in the perpendicular magnetic recording medium used in this invention, carbon (C) is added to the Co-Cr alloy film. Thus, even if the substrate temperature in forming the film is low, it is possible to ensure good magnetic characteristics, particularly the coercive force. It is preferable that carbon of 0.05 to 2.0% by weight be added and, more particularly, that the carbon be of 0.05 to 0.5% by weight. If the amount of carbon is less than 0.05% by weight, a satisfactory result will not be obtained. In contrast, if the amount of carbon exceeds 2.0% by weight, there is the possibility that the magnetic characteristic, particularly the perpendicular magnetic anisotropy, may be deteriorated.

The protective film 103 formed on the Co-Cr alloy film 102 containing C is comprised of carbon, and serves to improve the slide durability significantly. Examples of the material that may be used in the protective film 103 include $SiO_2$, etc. Selection of the film thickness is important. In this embodiment, the film thickness is about 30 to 400 Å. If the film thickness of the protective film 103 is less than 30 Å, a continuous film may not be formed, thus failing to ensure sufficient slide durability. On the other hand, if the film thickness is greater than 400 Å, an output particularly in the short wavelength band is reduced to one half because of spacing.

It is to be noted that a coating of any one of various known lubricants may be formed on the surface of the protective film 103 to improve running ability or the like.

When carbon (C) is added to the co-Cr alloy film, even if the substrate temperature at the time of forming the film is low, the magnetic characteristic, particularly the coercive force Hc is enhanced. As a result, noise is reduced.

By using this medium as the perpendicular magnetic recording medium onto which the digital image signal is recorded, the error rate is substantially improved.

In addition, the Co-Cr alloy film 102 to which carbon is added is well adapted to receive the carbon protective film 103. Accordingly, when a carbon protective film having a film thickness within a predetermined range is formed on the Co-Cr alloy film, the slide durability of the record medium is improved greatly.

A method of recording or reproducing a digital image signal on the magnetic recording medium discussed above will now be described with reference to apparatus for implementing this method.

Digital VTRs are adapted to digitize a color video signal and record it on a recording medium such as a magnetic tape. One type of digital VTR that has been developed is known as the component type digital VTR of the D1 format, and another type of digital VTR is known as the composite type digital VTR of the D2 format.

The D1 format digital VTR is adapted to convert to digital form a luminance signal and first and second color difference signals by using a sampling frequency of 13.5 MHz, and a sampling frequency of 6.75 MHz, respectively, and then to process those signals for recording on a magnetic tape. Since the sampling frequencies of these components exhibit the ratio of 4:2:2, this system is also known as the 4:2:2 system.

The D2 format digital VTR is adapted to sample a composite color video signal by using a sampling signal of a frequency four times the frequency of a color subcarrier wave signal, convert the samples to digital form and process the digital signals for recording on magnetic tape.

These digital VTRs are particularly designed for use in a broadcasting station and, therefore, picture quality is considered to be most important. Hence, each sample is, e.g., 8 bits, and is recorded without being substantially compressed. Therefore, even if a large capacity cassette of video tape is used in, for example the D1 format, a reproducing time of about 1.5 hours at the best can be obtained. Therefore, the D1 format digital VTR is not particularly suitable for ordinary home use.

In view of this, a method has been developed to record a signal having its shortest wavelength of 0.5 μm on a track having a width of, e.g., 5 μm so that a recording density of $8 \times 10^5$ bits/mm$^2$ or more is realized, and to compress the recorded information in a form which produces less distortion during reproduction. Even if a narrow magnetic tape having a tape width of 8 mm or less is used, the recording capacity of the digital VTR is improved.

An example of this digital VTR will now be described, first with reference to a signal processing unit for recording.

Figure 2:
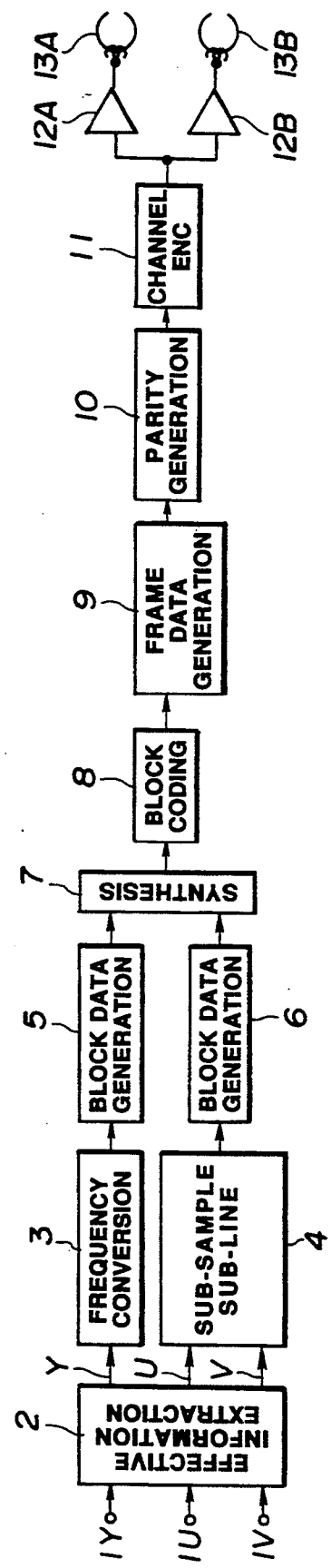
FIG. 2 is a block diagram of a signal processing unit on the recording side of a digital VTR for compressing a digital image signal in a form that results in less reproduction distortion.

FIG. 2 is a block diagram of the recording side and includes input terminals 1Y, 1U, 1V, to which are supplied a digital luminance signal Y, and digital color difference signals U, V formed from three primary color signals R, G, B produced by, e.g., a color video camera. The clock rates of the respective signals are assumed to be the same as the frequencies of the respective component signals of the D1 format. Namely, clock rates of 13.5 MHz and 6.75 MHz are used, and each luminance or color difference sample is formed of 8 bits. Accordingly, the amount of data supplied to the input terminals 1Y, 1U, 1V is about 216 Mbps. An effective information extraction circuit 2 is adapted to eliminate data in the blanking intervals of those signals to extract only information in the effective picture region, thereby compressing the amount of data to about 167 Mbps.

The luminaries signal Y at the output of the effective information extraction circuit 2 is coupled to a frequency converter 3, whereat the sampling frequency is converted from 13.5 MHz to a reduced value of about ⅔ thereof. A thinning filter may be used in the frequency converter so that no aliasing distortion is produced. An output signal of frequency converter 3 is supplied to a circuit adapted to generate luminance data in successive data blocks (hereinafter referred to as a data block generator), in which the order or sequence of the luminance data is converted to a block sequence. The data block generator 5 is used with a block encoder 8 in a subsequent stage.

Figure 4:
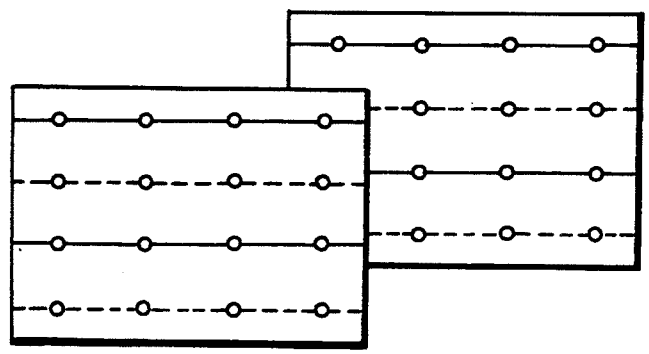
FIG. 4 is a schematic diagram of a block of data produced by block coding.

FIG. 4 is a schematic diagram of a block of data processed by the data block generator. In this example, a three-dimensional block is employed. By dividing a picture spanning two frames, a large number of blocks (each comprised of 4 lines×4 pixels×2 frames) are formed. It is to be noted that, in FIG. 4, the solid lines represent lines of odd fields, and the broken lines represent lines of even fields.

Figure 5:
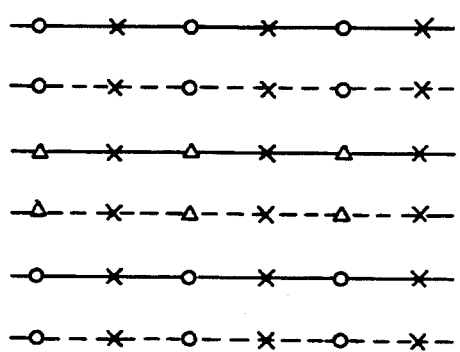
FIG. 5 is a schematic diagram useful in explaining sub-sampling and sub-line block 4 in FIG. 2.

Returning to FIG. 2, two color difference signals U, V at the outputs of the effective information extraction circuit 2 are supplied to a sub-sampling and sub-line circuit 4, at which their respective sampling frequencies are converted from 6.75 MHz to one half that frequency. Thereafter, the two digital color difference signals thus obtained are selected alternately line-by-line to form one channel of line sequential color difference data. The pixel configuration of a signal subjected to processing by the sub-sampling and sub-line circuit 4 is shown in FIG. 5. In this figure, o represents a sampling pixel of the first color difference signal U, Δ represents a sampling pixel of the second color difference signal V, and X represents the position of a pixel thinned (i.e. omitted) by sub-sampling.

The line sequential color difference data signal from the sub-sampling and sub-line circuit 4 is coupled to a circuit 6 for generating successive blocks of color difference data every block (hereinafter referred to as a data block generator). The data block generator 6, like data block generator 5, converts the sequence of the color difference data from that produced by the normal scanning of a television signal to a block sequence. Hence, data block generator 6 converts color difference data to blocks of data, with each block comprising 4 lines×4 pixels×2 frames. The output signals of data block generators 5 and 6 are coupled to a synthesis circuit 7.

In the synthesis circuit 7, the luminance signal blocks and the color difference signal blocks are combined to one channel of data. An output signal of this synthesis circuit 7 is supplied to a block encoder 8 which may be an adaptive dynamic range coder (ADRC), or a DCT (Discrete Cosine Transform) circuit, etc. An output signal from the block encoder 8 is coupled to a circuit 9 for generating frame data (hereinafter referred to as a frame data generator 9), which converts compressed data from block encoder 8 to data configured in a frame structure. Frame data generator 9 also converts the clock rate of the pixel system to the clock rate of the recording system.

The output signal of the frame data generator 9 is supplied to a parity generator 10 for generating and adding an error correcting code to the frame data. The output signal of the parity generator 10 is coupled to a channel encoder 11, which generates a recording code or modulation to decrease the low frequency band portion of the data to be recorded. The output signal from the channel encoder 11 is supplied to a pair of magnetic heads 13A, 13B through recording amplifiers 12A, 12B and rotary transformers (not shown) for recording onto a recording tape. It is to be noted that an audio signal is independently subjected to compression-coding and supplied to the channel encoder 11 for recording in the same track as the video signal.

By the above-described signal processing, 216 Mbps of input data is reduced to about 167 Mbps by extracting only data during the effective scanning period. Further, by frequency conversion and by sub-sampling and sub-line processing, the data rate of about 167 Mps is reduced to 84 Mbps. This data is compressed to about 25 Mbps by the compression coding of block encoder 8. Thereafter, by adding additive information such as parity or an audio signal, etc., the amount of recorded data is about 31.56 Mbps.

Figure 3:
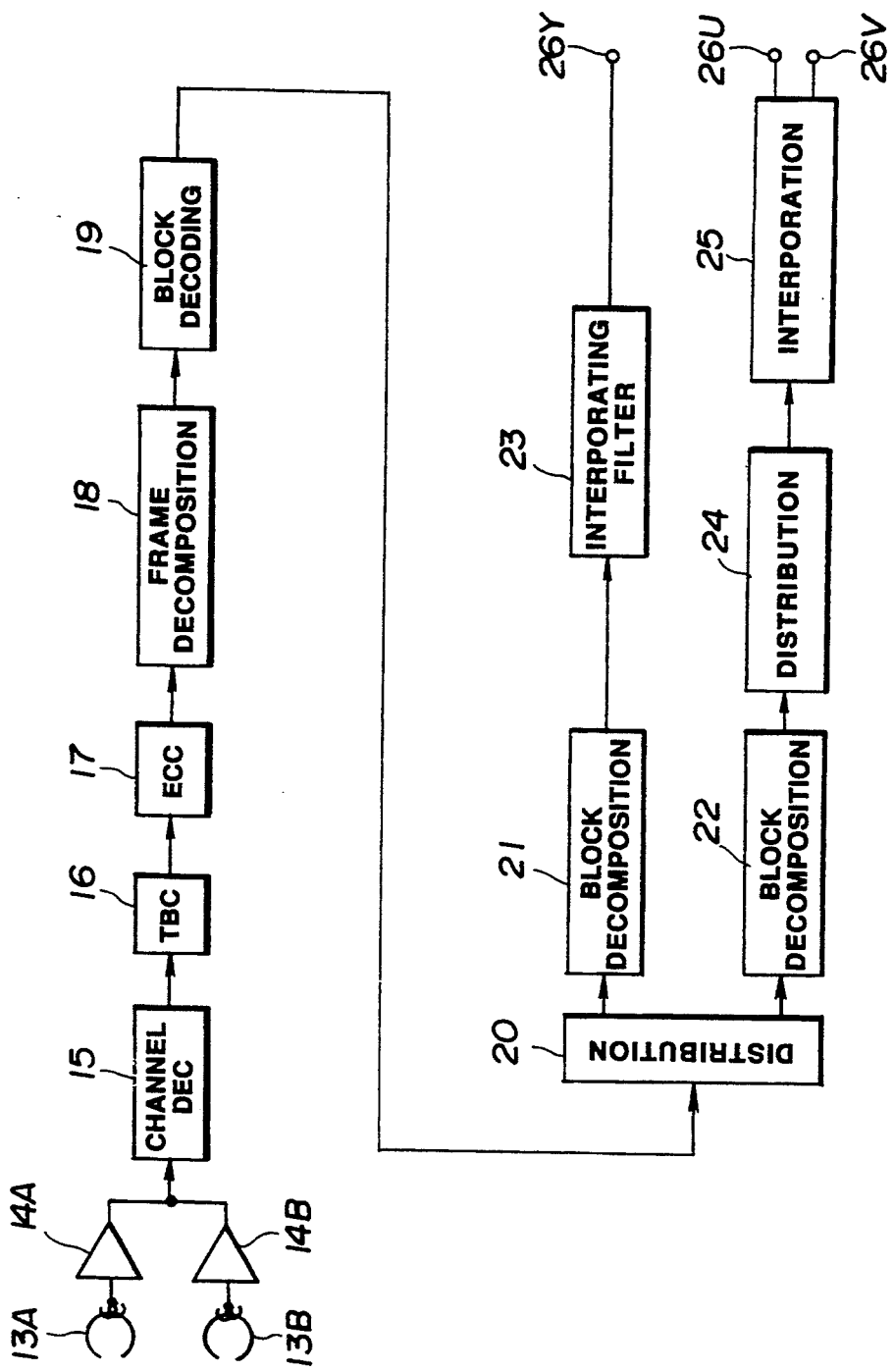
FIG. 3 is a block diagram of a signal processing unit on the reproducing side of the digital VTR.

Reference now is made to the apparatus of the reproducing side of the digital VTR, as shown in FIG. 3.

Regenerative data from the magnetic heads 13A, 13B are coupled to a channel decoder 15 through rotary transformers (not shown) and reproducing amplifiers 14A, 14B. At the channel decoder 15, the recording code or modulation that had been used for recording is demodulated, and the demodulated signal is supplied to a TBC (Time Base Correction) circuit 16. At this TBC circuit 16, the time base changes of the regenerative signal, such as jitter, are eliminated. The regenerative data from the TBC circuit 16 is coupled to an ECC circuit 17, at which error correction and error modification using the error correcting code provided by parity generator 10 are carried out. An output signal of the ECC circuit 17 is supplied to a frame decomposition circuit 18.

The frame decomposition circuit 18 separates the respective components of the block encoded data and converts the clock rate of the recording system to the clock rate of the pixel system. The separated data from the frame separation circuit 18 are coupled to a block decoder 19 which operates as the inverse of block encoder 8 to recover a single channel of chrominance and color difference data blocks. The decoded data thus obtained is supplied to a distribution circuit 20 which separates the decoded data into a luminance signal and color difference signals. The luminance signal and the color difference signals thus obtained are coupled to block decomposition circuits 21, 22, respectively, which convert the decoded data blocks to data in the form exhibiting the raster scanning sequence in a manner opposite to the operation of the data block generators 5, 6 of the transmitting side.

A decoded luminance signal from the block decomposition circuit 21 is supplied to an interpolating filter 23 which converts the sampling rate of the luminance signal from 3 fs to 4 fs (4 fs=13.5 MHz). The digital luminance signal Y from the interpolating filter 23 is provided at output terminal 26 Y.

The digital color difference signals from the block decomposition circuit 22 are supplied to a distribution circuit 24, at which line-sequential digital color difference signals U, V are separated into individual digital color difference signals U, V, at respective outputs. These digital color difference signals U, V from the distribution circuit 24 are coupled to an interpolating circuit 25, at which they are respectively interpolated. The interpolating circuit 25 serves to interpolate thinned (or omitted) line and pixel data by using restored pixel data. From this interpolating circuit 25, digital color difference signals U and V having a sampling rate of 2 fs are provided to output terminals 26 U, 26 V, respectively.

One embodiment of the block encoder 8 in FIG. 2 is an ADRC (Adaptive Dynamic Range Coding) encoder. This ADRC encoder serves to sense a-maximum value MAX and a minimum value MIN in plural pixel data included in respective blocks to detect a dynamic range DR of a block and carry out coding adapted to the dynamic range DR, thereby requantizing the data with a smaller number of bits than that of the original pixel data. As another example, the block encoder 8 may be of a configuration to implement DCT (Discrete Cosine Transform) processing of pixel data in respective blocks which produces coefficient data to implement Run Length Huffman Coding for compressing the quantized data.

In the present embodiment, an ADRC encoder is used. An example of an ADRC encoder which produces minimal degradation in the picture quality even when multi-dubbing is carried out will now be described witch reference to FIG. 6.

Figure 6:
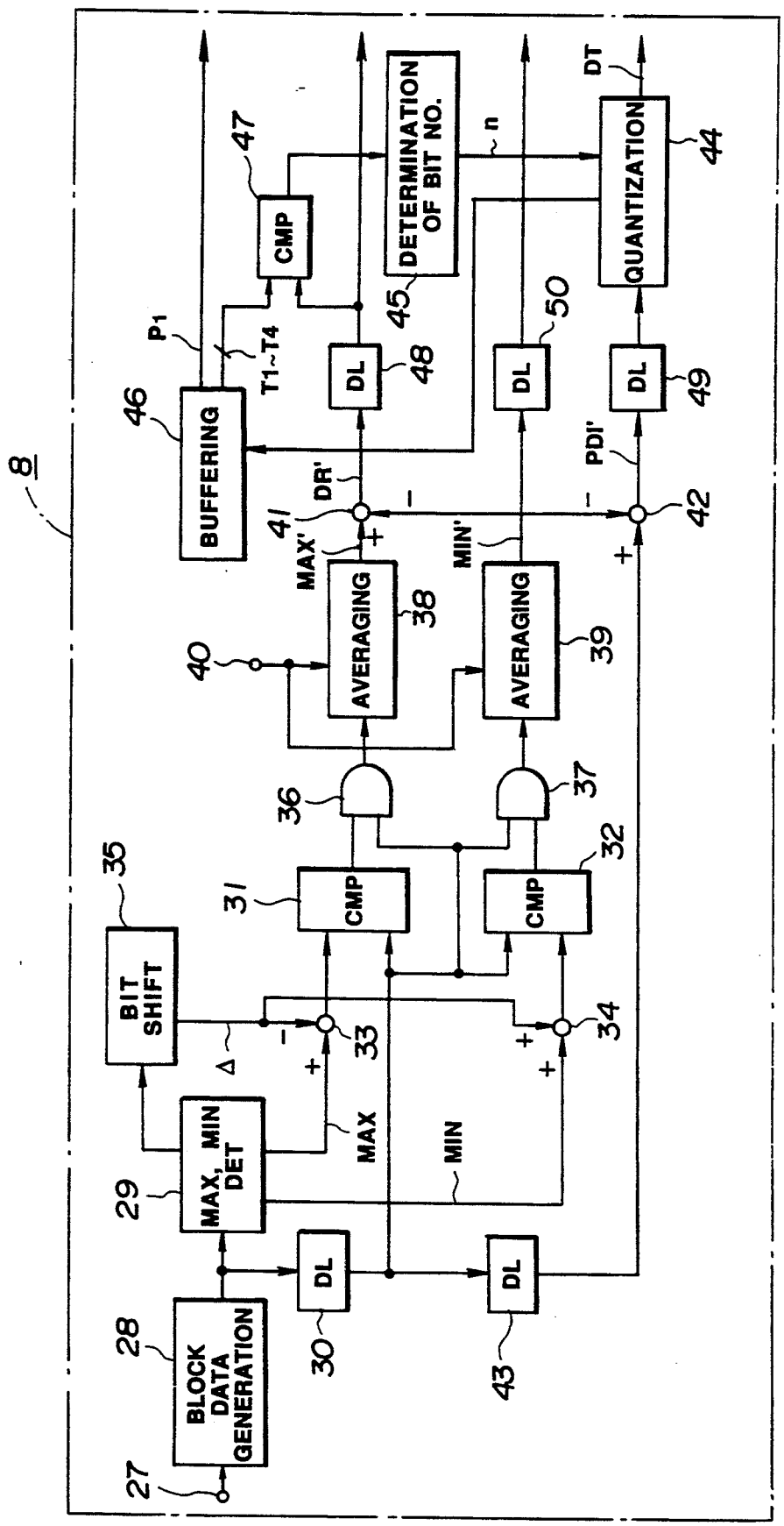
FIG. 6 is a block diagram of one example of a block encoder.

In FIG. 6, a digital video signal (or a digital color difference signal) quantized so that, e.g., one sample is represented by 8 bits is supplied from the synthesis circuit 7 of FIG. 2 to input terminal 27. Block data from the input terminal 27 is coupled to a maximum value/-minimum value detector 29 and a delay circuit 30. The maximum value/minimum value detector 29 detects a minimum value MIN and a maximum value MAX in every block. The delay circuit 30 delays the supplied input data by an amount needed to match the inherent time delay of the maximum value/minimum value detector. Pixel data from the delay circuit 30 is supplied to comparators 31 and 32.

The maximum value MAX from the maximum value/minimum value detector 29 is coupled to a subtracter 33, and the minimum value MIN from the detector 29 is coupled to an adder 34. A value of one quantization step width ($\Delta = 1/16$ DR) for the case where non-edge matching quantization is conducted by 4 bit fixed length is supplied to the subtracter and to the adder from a bit shift circuit 35. The bit shift circuit 35 is adapted to shift the dynamic range DR by four bits in order to carry out division by the factor (1/16). A threshold value (MAX−$\Delta$) is produced by the subtracter 33, and a threshold value (MIN+$\Delta$) is produced by the adder 34. The threshold values from the subtracter 33 and the adder 34 are applied to comparators 31, 32, respectively. It is to be noted that, as the value A prescribing these threshold values, a fixed value corresponding to a noise level may be used in addition to or in place of the quantization step width.

An output signal of the comparator 31 is coupled to an AND gate 36, and an output signal of the comparator 32 is coupled to an AND date 37. Input data from the delay circuit 30 also is supplied to these AND gates. When input video data is above the threshold value, an output signal produced by the comparator 31 exhibits a high level. Accordingly, the AND gate 36 extracts pixel data that is included in the maximum level range between MAX and MAX−$\Delta$. On the other hand, when the input video data is below the threshold value, an output signal produced by the comparator 32 exhibits a high level. Accordingly, the AND gate 37 extracts pixel data that is included in the minimum level range between MIN and MIN+$\Delta$.

The output signal of the AND gate 36 is supplied to an averaging circuit 38, and the output signal of the AND gate 37 is supplied to an averaging circuit 39. These averaging circuits 38, 39 serve to calculate average or mean values in each block. A reset signal whose period is equal to a block period is supplied from terminal 40 to the averaging circuits 38, 39. An average or mean value MAX′ of pixel data within the maximum level range of (MAX∼MAX−$\Delta$) is produced by averaging circuit 38 and an average or mean value MIN′ or pixel data within the minimum level range of (MIN∼MIN+$\Delta$) is produced by averaging circuit 39. The average or mean value MIN′ is subtracted from the average or mean value MAX′ by a subtracter 41 to produce a dynamic range DR′.

Further, the average or mean value MIN′ is coupled to a subtracter 42 whereat it is subtracted from the input video data supplied thereto by a delay circuit 43 to produce data PDI from which the minimum value is eliminated. This data PDI and the modified dynamic range DR′ are supplied to a quantizer 44. In this embodiment, variable length ADRC is used such that the number n of bits allocated for requantization may be 0 (no coded signal is transferred) 1, 2, 3 and 4, and edge matching quantization is carried out. The allocated bit number n is determined by a bit number determination circuit 45 for each block and this determined bit number n is supplied to the quantizer 44.

The variable length ADRC provides efficient coding by allocating a small bit number in blocks where the dynamic range DR′ is small, and by allocating a large bit number n in blocks where the dynamic range DR′ is large. More particularly, when the threshold value in determining the bit number n is assumed to be T1 to T4 (T1<T2<T3<T4), then the following bit numbers are determined: no coded signal is transferred and only information of the dynamic range DR′ is transferred in the block wherein (DR′<T1); the bit number n is set to 1 in the block wherein (T1$\leq$DR′<T2); the bit number n is set to 2 in the block (T2$\leq$DR′<T3); the bit number n is set to 3 in the block wherein (T3$\leq$DR′<T4); and the bit number n is set to 4 in the block wherein (DR′$\leq$T4).

In variable ADRC, the quantity of information generated may be controlled (so called a buffering) by changing the threshold values T1, T2, T3, T4. Accordingly, variable length ADRC is readily applicable to a transmission path such as a digital video tape recorder of this invention, in which the quantity of information generated per each frame must be a predetermined value.

A buffering circuit 46 is adapted to determine threshold values Ti$\leq$T4 by which a quantity of generated information is of a predetermined value. The buffering circuit provides a plurality of sets, e.g., 32 sets of threshold values identified by a parameter code Pi (i =0, 1, 2 ... 31). As the number i of the parameter code Pi becomes large, the quantity of generated information monotonically decreases. It is to be noted that as the quantity of generated information decreases, the picture quality of an image reproduced from that information deteriorates.

Threshold values T1–T4 from the buffering circuit 46 are supplied to a comparator 47, to which a dynamic range DR′ delayed by a delay circuit 48 also is supplied. The delay circuit 48 delays DR′ by a time needed to match the inherent delay of determining a predetermined set of threshold values in buffering circuit 46. At the comparator 47, the dynamic range DR' of a block and a respective set of threshold values are compared to each other. The resultant comparison output is coupled to bit number determination circuit 45 which determines the allocated bit number n of that block. Quantizer 44 uses the dynamic range DR' and the allocated bit number n to convert data PDI which is supplied thereto by a delay circuit 49, to a coded signal DT by quantization of the edge matching. The quantizer 44 is comprised of, e.g., a ROM.

Dynamic range DR' and average value MIN' are outputted through delay circuits 48, 50 and a parameter code Pi indicating the set of threshold values used to produce coded signal DT is outputted from buffering circuit 46. In this example, since a signal that was subjected to non-edge matching quantization now is subjected to edge matching quantization on the basis of dynamic range information, less degradation in the reproduced picture is obtained when dubbing is carried out.

The channel encoder 11 of FIG. 2 and the channel decoder 15 of FIG. 3 will now be described.

Figure 7:
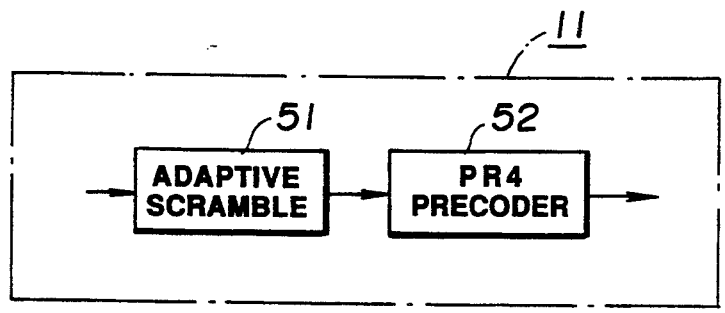
FIG. 7 is a block diagram of one example of a channel encoder.

In the channel encoder 11, as shown in FIG. 7, an adaptive scramble circuit, i.e., a scramble circuit 51 of plural M-series is supplied with an output of the parity generator 10. In this scramble circuit 51, an M-series is selected such that the scramble circuit output has the lowest high frequency component and d.c. component with respect to the input signal. This channel encoder 11 further includes a precoder 52 for a partial response class 4 detection system. This precoder 52 performs an arithmetic processing $1/1-D^2$ (D is a unit delay). An output of the precoder 52 is recorded by means of magnetic heads 13A, 13B through recording amplifiers 12A, 12B. Regenerative output thus obtained during reproduction is amplified by reproducing amplifiers 14A, 14B.

Figure 8:
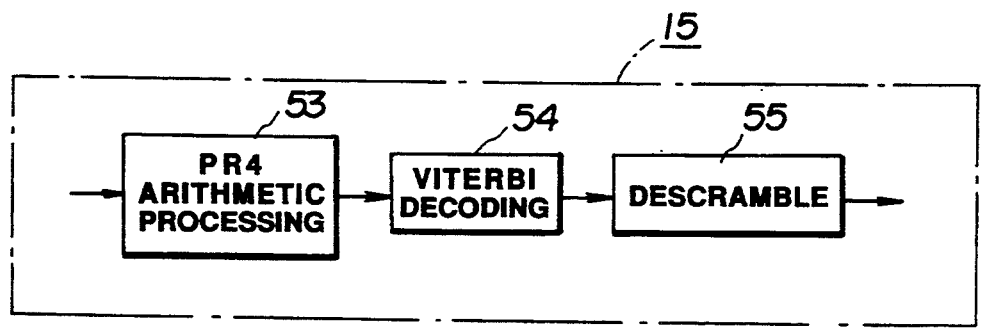
FIG. 8 is a block diagram of one example of a channel decoder.

In the channel decoder 15, as shown in FIG. 8, an arithmetic processing circuit 53 for partial response class 4 performs the arithmetic processing of $1+D$ on the outputs of the reproducing amplifiers 14A, 14B. A Viterbi decoder 54 decodes data from the arithmetic processing circuit 53 that may be accompanied by noise by using correlation between data or the probability of data, etc. An output of the Viterbi decoder 54 is coupled to a descramble circuit 55 which restores to its original series data that had been rearranged by scramble processing on the recording side. Thus, original data is reconstructed. By using the Viterbi decoder 54, an improvement in the regenerative C/N by 3 dB is obtained as compared to decoding every bit of the reproduced digital signals.

Figure 9:
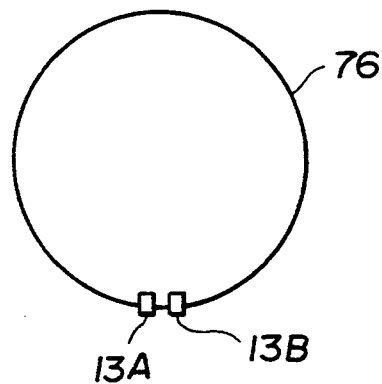
FIG. 9 is a plan view of one example of the arrangement of magnetic recording/reproducing heads.

Magnetic heads 13A and 13B are mounted on a drum 76 in a form such as shown in FIG. 9.

A magnetic tape (not shown) is obliquely wound on the circumferential surface of the drum 76 with a winding angle slightly larger than or slightly smaller than 180 degrees. Thus, both of the magnetic heads 13A and 13B scan the magnetic tape at the same time.

The directions of the gaps of the magnetic head 13A and the magnetic head 13B are set so that they are inclined opposite to each other (e.g., the magnetic head 13A is inclined by +20 degrees relative to the track width direction, and the magnetic head 13B is inclined by −20 degrees relative thereto). Thus, at the time of reproduction, crosstalk from adjacent tracks is reduced because of so-called azimuth loss.

Figure 10:
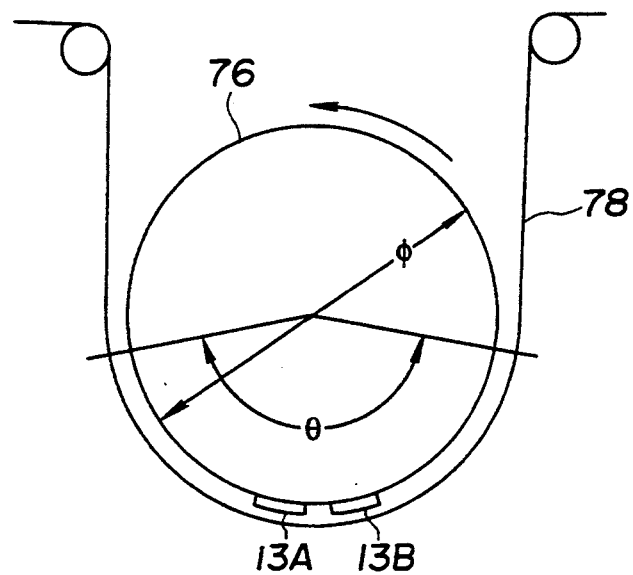
FIG. 10 is a plan view of an example of a rotary drum having magnetic tape wound thereabout.
Figure 11:
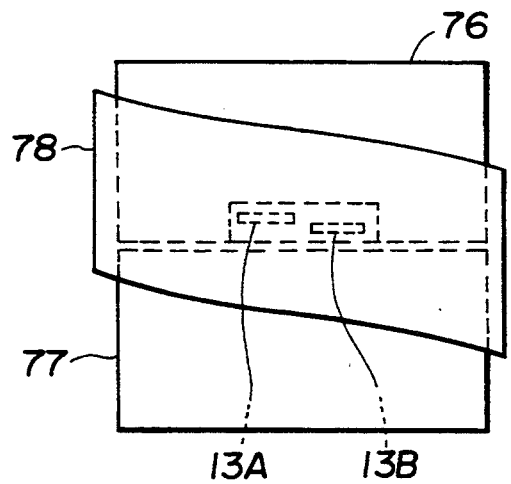
FIG. 11 is a front view of the rotary drum and magnetic tape of FIG. 10.

FIGS. 10 and 11 show a more practical configuration in which the magnetic heads 13A, 13B are of an integral structure (so called double azimuth head structure). The magnetic heads 13A, 13B of the integral structure are secured to, e.g., an upper rotary drum 76, and a lower drum 77 is fixed. In this example, the winding angle Θ of a magnetic tape 78 is 166 degrees, and the drum diameter φ is 16.5 mm.

Data of one field is recorded in a divided or segmented manner on five tracks of the magnetic tape 78. By this segment system, the length of a track can be shortened. Thus, an error due to the nonlinearity of the track can be reduced.

As a result of simultaneous recording by means of the double azimuth head structure, error due to nonlinearity can be reduced to a greater degree as compared to the recording system in which a pair of magnetic heads are 180° opposite to each other. Further, since the distance between the heads is small in this head structure, it is possible to more accurately carry out pairing adjustment. Hence, recording/reproduction can be carried out on a narrow track.

When a digital VTR having the configuration described above is used to carry out magnetic recording on a perpendicular magnetic recording medium including a Co-Cr alloy film as the magnetic layer, there is a difference in the error rate due to the coefficient of linear expansion of the non-magnetic support member used in the perpendicular magnetic recording medium, as will now be examined.

Figure 12:
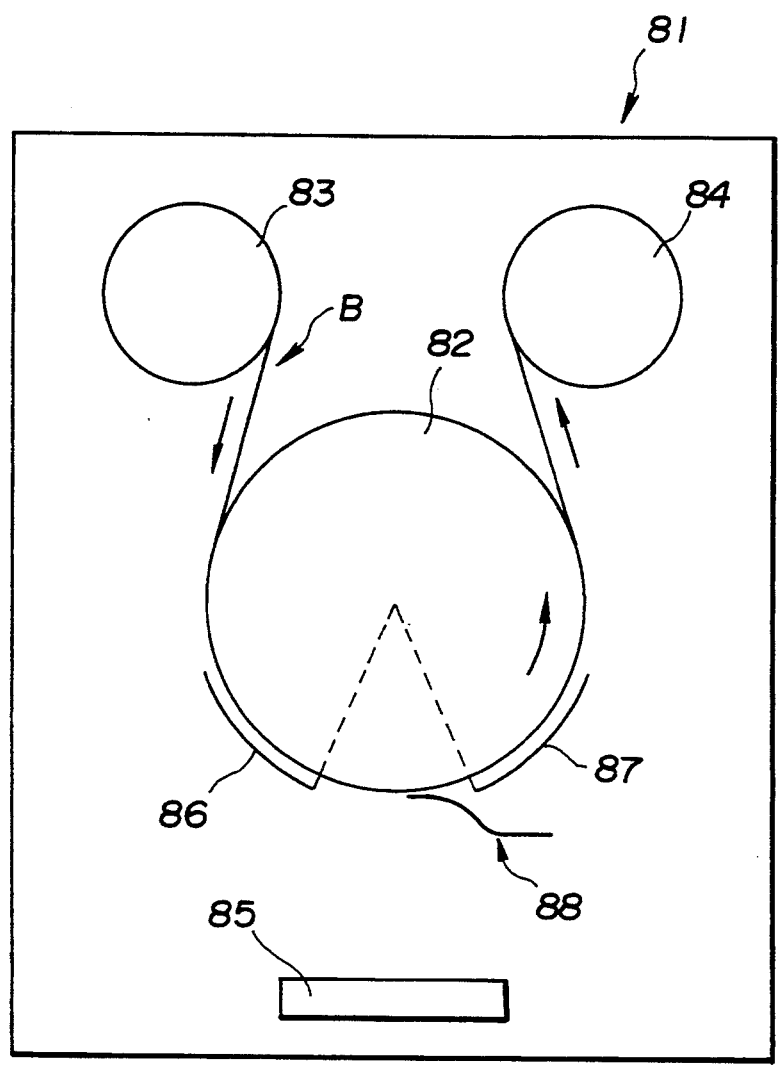
FIG. 12 is a schematic representation of a continuous sputtering system that may be used to form the magnetic medium of this invention.

A Co-Cr perpendicular magnetic recording medium was fabricated by using a continuous sputtering system as shown in FIG. 12.

In this sputtering system, a roll 82, known as a can roll, is disposed substantially at the central portion of the interior of a vacuum chamber 81, and a supply roll 83 and a take-up roll 84 are disposed at a position above the can roll 82.

Accordingly, a base roll B is supplied from the supply roll 83 to the can roll 82, and runs along the can roll 82. A Co-cr alloy film is formed and is wound or taken up by the take-up roll 84.

A target 85 comprised of Co-Cr alloy is disposed at a position below the can roll 82. Further, a pair of masks 86, 87 for limiting the incident angle of particles from the target 85, and a thermocouple 88 are provided in the vicinity of the can roll 82. The Co-Cr alloy film is formed in a direction substantially perpendicular to the base film B.

A polyimide film having thermal resistance more than 300° C. is used as the base film B. The width and the thickness of the base film B are 5 inches (127 mm) and 9 μ, respectively.

The sputtering operation is as follows. The temperature for cleaning the surface of the base film B is 150° C., and the temperature of the can roll 82 at the time of forming a Co-Cr alloy film is 230° C. Further, the back pressure Pb is $3 \times 10^{-6}$ Torr ($=4 \times 10^{-4}$ Pa), and the argon pressure $P_{Ar}$ is 1 m Torr ($=0.13$ Pa).

The target 85 has dimensions of 250 mm × 150 mm, and the power source is 2 KW (60V × 3.3A). DC magnetron type sputtering is carried out. The distance between the base film B and the target 85 is 70 mm, and the film formation speed is 2000 Å/min. Further, the feed speed of the base film B is 15 cm/min. The Co-Cr alloy film is formed so that its film thickness is equal to 2000 Å.

Polyimide films having different coefficients of thermal expansion $k_1$ were used to form Co-Cr alloy films comprising various samples 1~4. The coefficient $k_1$ of linear expansion in the TD direction before the magnetic thin film is formed, the coefficient $k_2$ of linear expansion after the magnetic thin film is formed, the number of shriveled portions produced in the samples, and the amount of cupping for samples 1 to 4 are shown in Table 1. In addition, the percentage of missing envelope when recording/reproduction is carried out by the digital VTR also is shown.

ence to missing envelope, any change in level of the signal envelope, except for drop out, is not observed. This is reflected in the error rate as a matter of course. However, when the coefficient $k_1$ of thermal expansion is above 0 mm/mm°C. and the coefficient $k_2$ is above 0.3 mm/mm°C., shriveling is produced in the magnetic recording medium; and the value of the coefficient $k_1$ or $k_2$ increases in the positive direction, the number of shriveled portions increases and the percentage of missing envelope increases substantially.

In another embodiment of this invention, a polyimide

TABLE 1

| SAMPLE | $k_1$ (mm/mm · °C.) | $k_2$ (mm/mm · °C.) | NO. OF SHRIVELED PORTIONS | AMOUNT OF CUPPING (mm) | MISSING ENVELOPE (%) |
|---|---|---|---|---|---|
| 1 | −1.2 | −0.4 | 0 | −0.8 | 0.03 |
| 2 | −0.5 | 0.3 | 0 | 0.5 | 0.1 |
| 3 | 0.2 | 0.5 | 2 | 1.0 | 5 |
| 4 | −0.7 | 0.7 | 10 | 1.5 | 20 |

The coefficient of linear expansion of the polyamide film in the TD direction in the range from 50° to 300° C. was measured in accordance with the following method by using TMA.

Consider first the measurement of the coefficient $k_1$ of linear expansion. The polyimide film is cut so that its dimension in the MD direction is 5 mm, and its dimension in the TD direction is 30 mm. This polyimide film is supported by a jig for TMA with a spacing of 10 mm. An extremely weak tension (about 1 gr weight) is applied to this jig to raise the temperature at a rate of about 5° to 10° C./min. At this time, a thermocouple is attached in the vicinity of the polyimide film to measure expansion and contraction of the polyimide film while monitoring temperature in the range from 50° to 300° C. If the temperature change and the quantity of expansion/extraction are respectively represented by $\Delta T$ and $\Delta L$, the coefficient $k_1$ may be expressed as $k_1 = \Delta L / L \cdot \Delta T$ (L = 10 mm). Now, with respect to the coefficient $k_2$ of linear expansion of the polyimide film after the magnetic thin film is formed, the back coat layer of the magnetic layer is removed leaving only the base film, thus making it possible to measure the coefficient $k_2$ by the same method as used to measure the coefficient $k_1$.

The percentage of missing envelope is expressed by a ratio of the length of time during which the level of the signal envelope drops down to less than −3 dB with respect to the maximum level to round time.

As is seen from the Table 1, when the coefficient $k_1$ of linear expansion of the polyimide film is less than 0 mm/mm°C. and the coefficient $k_2$ of linear expansion is less than 0.3 mm/mm, shriveling is not produced, and the amount of cupping is small. Also, and with reference film 40 μm thick having a heat resistance of more than 300° C. was used as the base film B. Sputtering was as follows: The gas outlet temperature was 150° C., the back pressure Pb was $3 \times 10^{-6}$ Torr ($=4 \times 10^{-4}$ Pa), and the argon pressure $P_{Ar}$ was 1 m Torr ($=0.13$ Pa).

A Co-Cr target (including Cr of 21% by weight) was used as target 85. A carbon chip was mounted on the Co-Cr target having a surface area in the range from 0.5 to 5% relative to the target area and the power source was 2 kW (600V × 3.3A). Thus, DC magnetron type sputtering was carried out. The distance between the base film B and the target 85 was 70 mm, and the film formation speed was 2000 Å/min. Further, the feed speed of the base film B was 15 cm/min. The Co-Cr alloy film containing C was formed so that its film thickness was equal to 2000 Å.

In accordance with the above-described technique, various samples of Co-Cr alloy films containing C were formed by Changing the quantity of carbon added. Thereafter, protective films were formed thereon to further coat lubricants on the surface thereof. By using the previously described VTR, digital signals were recorded on and reproduced from these various samples. The composition of the Co-Cr alloy film, the kind of protective films, and the film thickness in the perpendicular magnetic recording medium of these samples are shown in Table 2.

TABLE 2

| | COMPOSITION OF MAGNETIC LAYER | PROTECTIVE FILM | |
|---|---|---|---|
| | | MATERIAL | FILM THICKNESS |
| EMBODIMENT 1 | $Co_{79}Cr_{20.5}C_{0.5}$ | C | 100Å |
| EMBODIMENT 2 | $Co_{78.5}Cr_{20.5}C_{1.0}$ | C | 100Å |
| EMBODIMENT 3 | $Co_{79}Cr_{20.5}C_{0.5}$ | C | 50Å |
| EMBODIMENT 4 | $Co_{82}Cr_{17.5}C_{0.5}$ | C | 100Å |
| COMP. EX. 1 | $Co_{79}Cr_{21}$ | C | 100Å |
| COMP. EX. 2 | $Co_{79}Cr_{20.5}C_{0.5}$ | — | — |
| COMP. EX. 3 | $Co_{77.5}Cr_{19.5}C_3$ | C | 100Å |
| COMP. EX. 4 | $Co_{79}Cr_{20.5}C_{0.5}$ | $SiO_2$ | 100Å |
| COMP. EX. 5 | $Co_{79}Cr_{20.5}C_{0.5}$ | Co—O | 100Å |
| COMP. EX. 6 | $Co_{79}Cr_{20.5}C_{0.5}$ | C | 450Å |

The substrate temperature necessary for the coercive force Hc to be 1000 (Oe), the perpendicular magnetic anisotropy $Hk_{eff}$, the relative output when a signal of wavelength of 0.5 μm is recorded and then reproduced, and the slide durability of these samples were examined;

and the error rate of the signals reproduced by the digital VTR was measured.

The perpendicular magnetic anisotropy $Hk_{eff}$ was calculated or determined by the gradient of the M-H loop in an in-plane direction measured by using a vibration sample type magnetometer (VSM). The relative output was measured by using a magnetic head of the metal-in gap type having a track width of 20 μm, a gap length of 0.25 μm, and a depth of 20 μm at a linear speed of 3 m/sec. The slide durability was measured as the number of passes before the signal level dropped from an initial playback value to −3 dB.

TABLE 3

|  | SUBSTRATE TEMP. | $Hk_{eff}$ (kOe) | RELATIVE OUTPUT (dB) | SLIDE DURABILITY (NO. OF PASSES) | ERROR RATE |
| --- | --- | --- | --- | --- | --- |
| EMBODIMENT 1 | 160 | 5.4 | 0 | >100000 | $>10^{-5}$ |
| EMBODIMENT 2 | 150 | 5.2 | 0 | >100000 | $>10^{-5}$ |
| EMBODIMENT 3 | 160 | 5.4 | +1 | >100000 | $>10^{-5}$ |
| EMBODIMENT 4 | 160 | 5.4 | 0 | >100000 | $>10^{-5}$ |
| COMP. EX. 1 | 200 | 5.4 | 0 | >100000 | $2 \times 10^{-5}$ |
| COMP. EX. 2 | 160 | 5.4 | — | <10 | — |
| COMP. EX. 3 | 150 | 3.8 | 0 | >100000 | $1 \times 10^{-4}$ |
| COMP. EX. 4 | 160 | 5.4 | 0 | 50000 | $2 \times 10^{-5}$ |
| COMP. EX. 5 | 160 | 5.4 | 0 | 80000 | $1.5 \times 10^{-5}$ |
| COMP. EX. 6 | 160 | 5.4 | −6.5 | >100000 | $1 \times 10^{-3}$ |

As is apparent from the above Table 3, by adding carbon into the Co-Cr alloy, the substrate temperature may be lowered by more than 40° C.

It should be noted that, as is seen from comparative example 3, when too much carbon is added, the perpendicular magnetic anisotropy deteriorates and the error rate also deteriorates.

In addition, as is apparent from comparative example 2, if only carbon is added, the slide durability is noticeably bad. Therefore, a protective film is required.

In order to compare the performances of the protective films, a comparison between the respective embodiments of the present invention and comparative examples 4 and 5 will now be described. When carbon is used as the protective film, the slide durability is improved significantly. However, when $SiO_2$ or Co-O is used as the protective film, while there is some improvement, the durability is worse than for carbon.

When considering the film thickness of the protective film, if the film thickness is large, as in the case of comparative example 6, the signal output level is lowered and the error rate is increased substantially.

While an explanation has been given in connection with practical embodiments of this invention, it should be noted that this invention is not limited to those embodiments. Various modifications/alterations may be made which do not depart from the gist of this invention. For example, while a Co-Cr alloy film containing C has been described as being formed by sputtering, vacuum deposition may be used for this purpose.

In addition, while a polyimide film has been described as the base film, any film having thermal resistance to some degree may be used for this purpose.

What is claimed is:

1. A magnetic recording medium formed of a metal magnetic thin film on a non-magnetic support member, said metal magnetic thin film consisting essentially of cobalt (Co) and chromium (Cr) as its major components and said non-magnetic support member consisting essentially of a polyimide film having a coefficient of linear expansion $k_1$ less than 0 mm/mm°C. in a temperature range from 200° C. to 300° C. before the metal magnetic thin film is formed thereon, and a coefficient of linear expansion $k_2$ less than $0.3 \times 10^{-5}$ mm/mm°C. in a temperature range from 200° C. to 300° C. after the metal magnetic thin film is formed thereon.

2. A magnetic recording medium as in claim 1, wherein said metal magnetic thin film contains carbon of 0.05 to 2.0% by weight and has a carbon protective film with a thickness of 30 to 400 Å formed on said metal magnetic thin film.

3. A magnetic recording medium as in claim 2, wherein said magnetic film is comprised of cobalt in the amount of about 78.5 to 82% by weight and chromium in the amount of about 17.5 to 20.5% by weight.

* * * * *